US011121558B2

(12) United States Patent
Masuda

(10) Patent No.: US 11,121,558 B2
(45) Date of Patent: Sep. 14, 2021

(54) CHARGING DEVICE

(71) Applicant: Toyota Jidosha Kabushiki Kaisha, Toyota (JP)

(72) Inventor: Tomokazu Masuda, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 16/596,028

(22) Filed: Oct. 8, 2019

(65) Prior Publication Data
US 2020/0144840 A1    May 7, 2020

(30) Foreign Application Priority Data

Nov. 7, 2018  (JP) .............................. JP2018-209566

(51) Int. Cl.
| | |
|---|---|
| *H02J 7/00* | (2006.01) |
| *B60L 50/16* | (2019.01) |
| *B60L 1/00* | (2006.01) |
| *H02J 7/04* | (2006.01) |

(52) U.S. Cl.
CPC ............... *H02J 7/00* (2013.01); *B60L 1/003* (2013.01); *B60L 50/16* (2019.02); *H02J 7/045* (2013.01)

(58) Field of Classification Search
USPC ................. 320/106, 107, 108, 110, 112, 114
See application file for complete search history.

(56) References Cited

U.S. PATENT DOCUMENTS

| | | | | |
|---|---|---|---|---|
| 2013/0327754 | A1* | 12/2013 | Salsich | B23K 9/1043 219/137.71 |
| 2014/0111120 | A1* | 4/2014 | Mitsutani | H02H 9/001 318/139 |
| 2016/0272070 | A1 | 9/2016 | Kojima | |
| 2017/0225572 | A1* | 8/2017 | Kawanaka | G01R 31/327 |
| 2018/0069388 | A1* | 3/2018 | Kim | H02H 3/085 |

(Continued)

FOREIGN PATENT DOCUMENTS

| | | | |
|---|---|---|---|
| JP | 2012170286 A | * | 9/2012 |
| JP | 2012253993 A | * | 12/2012 |

(Continued)

OTHER PUBLICATIONS

U.S. Appl. No. 16/566,340, filed Sep. 10, 2019.
U.S. Appl. No. 16/560,069, filed Sep. 4, 2019.

*Primary Examiner* — Brian Ngo
(74) *Attorney, Agent, or Firm* — Dinsmore & Shohl LLP

(57) ABSTRACT

A charging device includes: a switch configured to perform connection and disconnection between a positive bus and a negative bus of a charging line; a low-voltage power storage device having a normal voltage lower than a normal voltage of a power storage device; and a converter configured to exchange electric power between a power line and the low-voltage power storage device with a change of a voltage. At the time of system activation, a control device controls the switch so that the positive bus and the negative bus of the charging line are connected to each other, and after that, the control device performs a welding diagnosis to determine whether or not welding occurs in a charging relay, based on a voltage of a capacitor, while the control device controls the converter so that the capacitor is charged with electric power from the low-voltage power storage device.

7 Claims, 7 Drawing Sheets

(56) References Cited

U.S. PATENT DOCUMENTS

| | | | |
|---|---|---|---|
| 2019/0193589 A1* | 6/2019 | Toriumi | H01M 8/04873 |
| 2019/0237979 A1* | 8/2019 | Yamada | H02J 7/0029 |
| 2020/0023742 A1* | 1/2020 | Takinai | B60L 3/0046 |
| 2020/0134944 A1* | 4/2020 | Yumoto | B60L 3/04 |

FOREIGN PATENT DOCUMENTS

| | | | |
|---|---|---|---|
| JP | 2014087156 A | * | 5/2014 |
| JP | 2016-073110 A | | 5/2016 |
| JP | 2016-174468 A | | 9/2016 |

* cited by examiner

CHARGING DEVICE

CROSS-REFERENCE TO RELATED APPLICATIONS

This application claims priority to Japanese Patent Application No. 2018-209566 filed on Nov. 7, 2018, which is incorporated herein by reference in its entirety including the specification, drawings and abstract.

BACKGROUND

1. Technical Field

The disclosure relates to a charging device, and more specifically relates to a charging device including a system main relay, a capacitor, a charging-side connecting portion, and a charging relay.

2. Description of Related Art

In the related art, as a charging device of this type, there has been proposed a charging device including a system main relay, a charging-side connecting portion (inlet), and a charging relay (e.g., see Japanese Unexamined Patent Application Publication No. 2016-73110 (JP 2016-73110 A)). The system main relay performs connection and disconnection between a power storage device and a power line. The charging-side connecting portion is connected to an external-side connecting portion (connector) of an external power supply device. The charging relay performs connection and disconnection between the power line and a charging line connected to the charging-side connecting portion. In the charging device, a cover is provided in the charging-side connecting portion, and when the cover is closed, a welding diagnosis on the charging relay is performed based on a voltage to be applied to the charging-side connecting portion in a state where the system main relay is turned on and the charging relay is turned off.

SUMMARY

In the meantime, in a charging device in which a charging-side connecting portion is not provided with a cover or in a charging device that cannot detect a cover being closed even if a charging-side connecting portion is provided with the cover, in a case where a welding diagnosis on a charging relay is performed based on a voltage to be applied to the charging-side connecting portion in a state where a system main relay is turned on and the charging relay is controlled so that the charging relay is turned off, when the charging relay is actually welded, a voltage of a power storage device is applied to the charging-side connecting portion.

A main object of a charging device of the disclosure is to avoid a voltage of a power storage device from being applied to a charging-side connecting portion at the time of a welding diagnosis on a charging relay.

In order to achieve the main object, the charging device of the disclosure employs the following approach.

A first charging device of the disclosure is a charging device for performing external charging to charge a power storage device with electric power from an external power supply device. The charging device includes a system main relay, a capacitor, a charging-side connecting portion, a charging relay, a control device, a switch, a low-voltage power storage device, and a converter. The system main relay is configured to perform connection and disconnection between the power storage device and a power line. The capacitor is connected to a positive bus and a negative bus of the power line. The charging-side connecting portion is connectable to an external-side connecting portion of the external power supply device. The charging relay is configured to perform connection and disconnection between the power line and a charging line connected to the charging-side connecting portion. The control device is configured to control the system main relay and the charging relay. The switch is configured to perform connection and disconnection between a positive bus and a negative bus of the charging line. The low-voltage power storage device has a normal voltage lower than a normal voltage of the power storage device. The converter is configured to exchange electric power between the power line and the low-voltage power storage device with a change of a voltage. At the time of system activation, the control device controls the switch so that the positive bus and the negative bus of the charging line are connected to each other, and after that, the control device performs a welding diagnosis to determine whether or not welding occurs in the charging relay, based on a voltage of the capacitor, while the control device controls the converter so that the capacitor is charged with electric power from the low-voltage power storage device.

The first charging device of the disclosure includes: the switch configured to perform connection and disconnection between the positive bus and the negative bus of the charging line; the low-voltage power storage device having a normal voltage lower than the normal voltage of the power storage device; and the converter configured to exchange electric power between the power line and the low-voltage power storage device with a change of a voltage. At the time of system activation, the control device controls the switch so that the positive bus and the negative bus of the charging line are connected to each other, and after that, the control device performs a welding diagnosis to determine whether or not welding occurs in the charging relay, based on the voltage of the capacitor, while the control device controls the converter so that the capacitor is charged with electric power from the low-voltage power storage device. At the time of system activation, the system main relay is turned off, and the welding diagnosis is performed by connecting the positive bus and the negative bus of the charging line via the switch. Accordingly, it is possible to avoid a voltage of the power storage device from being applied to the charging-side connecting portion at the time when the welding diagnosis is performed on the charging relay. Here, the "switch" can include a relay, a transistor, or the like.

A second charging device of the disclosure is a charging device for performing external charging to charge a power storage device with electric power from an external power supply device. The charging device includes: a system main relay, a capacitor, a charging-side connecting portion, a charging relay, a control device, and a switch. The system main relay is configured to perform connection and disconnection between the power storage device and a power line. The capacitor is connected to a positive bus and a negative bus of the power line. The charging-side connecting portion is connected to an external-side connecting portion of the external power supply device. The charging relay is configured to perform connection and disconnection between the power line and a charging line connected to the charging-side connecting portion. The control device is configured to control the system main relay and the charging relay. The switch is configured to perform connection and disconnection between a positive bus and a negative bus of the charging line. When the external charging stops irregularly, the control device controls the system main relay and the charging relay so that the system main relay and the charging relay are turned off, and after that, the control device performs a welding diagnosis to determine whether or not welding occurs in the charging relay, based on a voltage of the capacitor, while the control device controls the switch so that the positive bus and the negative bus of the charging line are connected to each other.

The second charging device of the disclosure includes the switch configured to perform connection and disconnection between the positive bus and the negative bus of the charging line. When the external charging stops irregularly, the control device controls the system main relay and the charging relay so that the system main relay and the charging relay are turned off, and after that, the control device performs a welding diagnosis to determine whether or not welding occurs in the charging relay, based on the voltage of the capacitor, while the control device controls the switch so that the positive bus and the negative bus of the charging line are connected to each other. After the system main relay is turned off, the positive bus and the negative bus of the charging line are connected via the switch, and then, the welding diagnosis is performed. Accordingly, it is possible to avoid a voltage of the power storage device from being applied to the charging-side connecting portion at the time when the welding diagnosis is performed on the charging relay. Here, the "switch" can include a relay, a transistor, or the like.

The second charging device of the disclosure may further include: a low-voltage power storage device having a normal voltage lower than a normal voltage of the power storage device; and a converter configured to exchange electric power between the power line and the low-voltage power storage device with a change of a voltage. After the control device performs the welding diagnosis, the control device may control the converter so that the capacitor is discharged. With such a configuration, electric charge remaining in the capacitor can be discharged after the welding diagnosis is performed.

Further, in the first or second charging device of the disclosure, in the welding diagnosis, when the voltage of the capacitor is a diagnosis voltage or more, the control device may determine that no welding occurs in the charging relay, and when the voltage of the capacitor is less than the diagnosis voltage, the control device may determine that welding occurs in the charging relay. Here, the "diagnosis voltage" is a threshold based on which it is determined whether or not the voltage is applied to the capacitor. In a case where the system main relay is turned off and the positive bus and the negative bus of the charging line are connected via the switch, when the charging relay is welded, short-circuit is caused between the positive bus and the negative bus of the power line, so that the voltage of the capacitor becomes a low value near a value of 0. Accordingly, by comparing the voltage of the capacitor with the diagnosis voltage, it is possible to determine whether or not welding occurs in the charging relay.

Further, in the first or second charging device of the disclosure, the charging relay may include: a positive-side relay configured to perform connection and disconnection between the positive bus of the charging line and the positive bus of the power line; and a negative-side relay configured to perform connection and disconnection between the negative bus of the charging line and the negative bus of the power line. As the welding diagnosis, the control device may determine whether one-pole welding in which either one of the positive-side relay and the negative-side relay is welded occurs or not. With such a configuration, it is possible to determine whether one-pole welding occurs or not.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next will be described a mode for carrying out the disclosure with reference to an embodiment.

Figure 1:
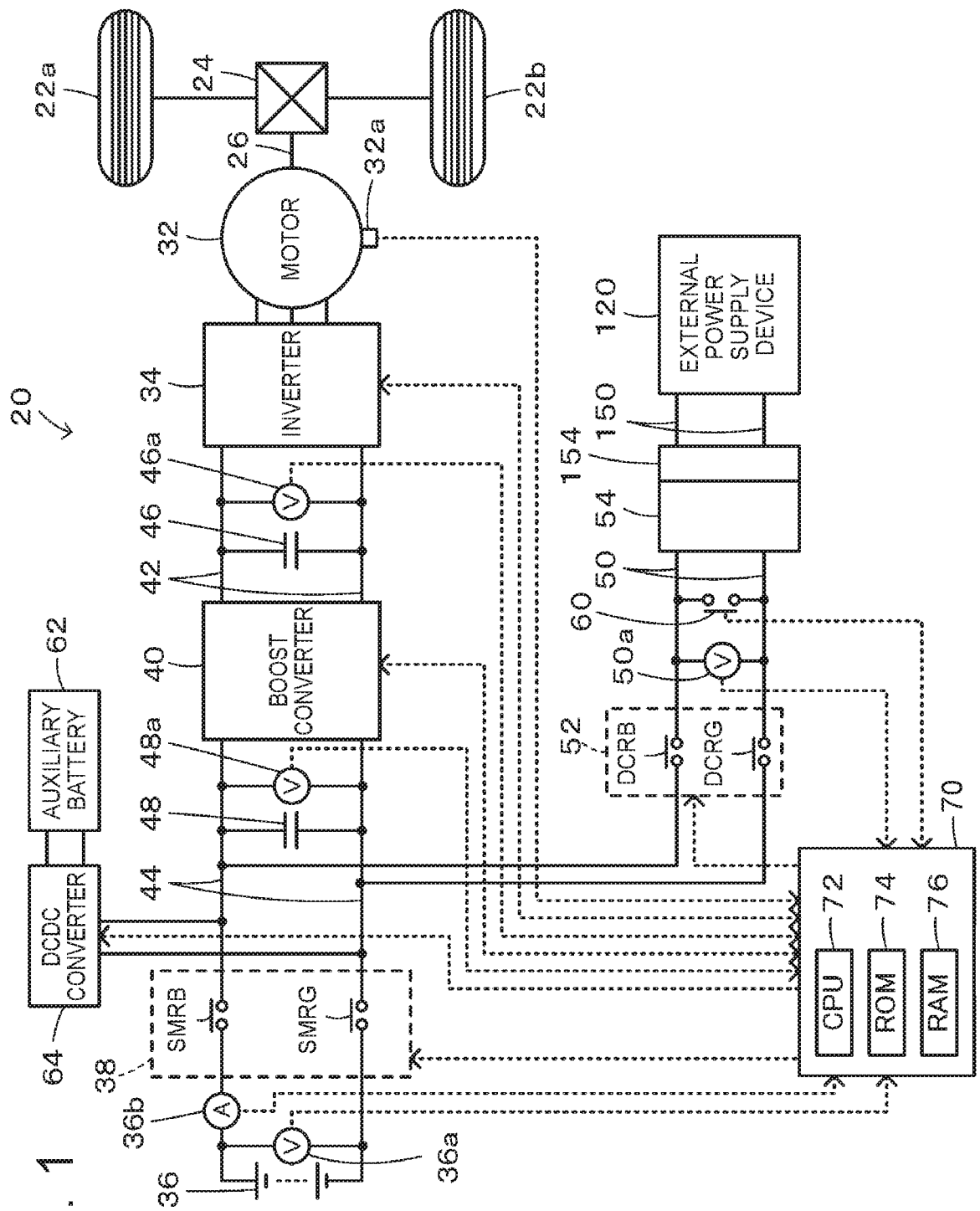
FIG. 1 is a configuration diagram illustrating an outline of a configuration of an electric vehicle 20 provided with a charging device as one embodiment of the disclosure.

FIG. 1 is a configuration diagram illustrating an outline of a configuration of an electric vehicle 20 provided with a charging device as one embodiment of the disclosure. As illustrated in the figure, the electric vehicle 20 of the embodiment includes a motor 32, an inverter 34, a battery 36, a boost converter 40, a system main relay 38, a high-voltage-side capacitor 46, a low-voltage-side capacitor 48, a charging power line 50, a vehicle side inlet 54, a charging relay 52, a diagnosis relay 60, an auxiliary battery 62, a DCDC converter 64, and an electronic control unit 70. In the present embodiment, the system main relay 38, the low-voltage-side capacitor 48, the vehicle side inlet 54, the charging relay 52, the diagnosis relay 60, the DCDC converter 64, and the electronic control unit 70 correspond to the "charging device."

The motor 32 is configured as a synchronous generator-motor and includes a rotor in which permanent magnets are embedded and a stator around which a three-phase coil is wound. The rotor of the motor 32 is connected to a drive shaft 26 connected to driving wheels 22a, 22b via a differential gear 24.

The inverter 34 is connected to the motor 32 and connected to a high-voltage-side power line 42. The inverter 34 is configured as a well-known inverter circuit including six transistors and six diodes.

The battery 36 is configured as a lithium-ion secondary battery or a nickel hydride secondary battery, for example, and is connected to a low-voltage-side power line 44.

The boost converter 40 is connected to the high-voltage-side power line 42 and the low-voltage-side power line 44 and is configured as a well-known buck-boost converter circuit including two transistors, two diodes, and a reactor. The boost converter 40 boosts electric power from the low-voltage-side power line 44 and supplies it to the high-voltage-side power line 42 and boosts electric power from the high-voltage-side power line 42 and supplies it to the low-voltage-side power line 44.

The system main relay 38 performs connection and disconnection between the low-voltage-side power line 44 and the battery 36. The system main relay 38 includes a positive-side relay SMRB provided in a positive bus of the low-voltage-side power line 44, and a negative-side relay SMRG provided in a negative bus of the low-voltage-side power line 44.

The high-voltage-side capacitor 46 is connected to a positive bus and a negative bus of the high-voltage-side power line 42. The low-voltage-side capacitor 48 is connected to the positive bus and the negative bus of the low-voltage-side power line 44.

The vehicle side inlet 54 is configured to be connectable to an external-side connecting portion 154 of an external power supply device 120. The charging power line 50 is connected to the vehicle side inlet 54. The charging power line 50 is connected between the charging relay 52 and the vehicle side inlet 54. The charging power line 50 is connected to an external-side charging power line 150 from the external power supply device 120 by connecting the external-side connecting portion 154 of the external power supply device 120 to the vehicle side inlet 54. Although not illustrated herein, the external power supply device 120 is connected to an external commercial power supply and is configured to convert electric power from the commercial power supply into direct-current power and supply it from the external-side charging power line 150.

The charging relay 52 performs connection and disconnection between the charging power line 50 and the low-voltage-side power line 44. The charging relay 52 includes a positive-side relay DCRB configured to perform connection and disconnection between a positive bus of the charging power line 50 and the positive bus of the low-voltage-side power line 44, and a negative-side relay DCRG configured to perform connection and disconnection between a negative bus of the charging power line 50 and the negative bus of the low-voltage-side power line 44.

The diagnosis relay 60 performs connection and disconnection between the positive bus and the negative bus of the charging power line 50.

The auxiliary battery 62 is configured as a lead storage battery having a normal voltage lower than that of the battery 36, for example, and supplies electric power to accessories (not shown). The auxiliary battery 62 is connected to the low-voltage-side power line 44 via the DCDC converter 64. The DCDC converter 64 is configured to exchange electric power between the auxiliary battery 62 and the low-voltage-side power line 44 with a change of a voltage.

The electronic control unit 70 is configured as a microprocessor mainly constituted by a CPU 72 and includes a ROM 74 in which a processing program is stored, a RAM 76 in which data is temporarily stored, a flash memory (not shown), input and output ports (not shown), and a communication port (not shown), in addition to the CPU 72.

Signals from various sensors are input into the electronic control unit 70 via the input port. The signals input into the electronic control unit 70 include, for example, a rotation position θm from a rotational position detecting sensor (e.g., a resolver) 32a configured to detect a rotation position of the rotor of the motor 32, a voltage VB from a voltage sensor 36a attached between terminals of the battery 36, and a current IB from a current sensor 36b attached to an output terminal of the battery 36. Further, the signals include a voltage VH of the high-voltage-side capacitor 46 (the high-voltage-side power line 42) from the voltage sensor 46a attached between terminals of the high-voltage-side capacitor 46, and a voltage VL of the low-voltage-side capacitor 48 (the low-voltage-side power line 44) from the voltage sensor 48a attached between terminals of the low-voltage-side capacitor 48. Further, a state signal from the voltage sensor 50a attached to the charging power line 50 is also input. Note that, when the voltage of the charging power line 50 is a determination voltage Vcref or more, the voltage sensor 50a outputs an ON-state signal, and when the voltage of the charging power line 50 is less than the determination voltage Vcref, the voltage sensor 50a outputs an OFF-state signal. The electronic control unit 70 also functions as a drive control device for the vehicle and receives information necessary for a travel control. Although not illustrated herein, these pieces of information include, for example: an ignition signal from an ignition switch; a shift position from a shift position sensor that detects an operation position of a shift lever; an accelerator opening degree Acc from an accelerator pedal position sensor that detects a stepping amount of an accelerator pedal; a brake pedal position from a brake pedal position sensor that detects a stepping amount of a brake pedal; a vehicle speed V from a vehicle speed sensor; and so on.

Various control signals are output from the electronic control unit 70 via the output port. The signals output from the electronic control unit 70 include, for example: a switching control signal to a transistor of the inverter 34; a switching control signal to a transistor of the boost converter 40; a driving control signal to the system main relay 38; a driving control signal to the charging relay 52; a driving control signal to the diagnosis relay 60; a driving control signal to the DCDC converter 64; and so on.

In the electric vehicle 20 configured as such in the embodiment, the electronic control unit 70 performs the following travel control. In the travel control, in a state where the system main relay 38 is turned on and the charging relay 52 and the diagnosis relay 60 are turned off, the electronic control unit 70 sets a requested torque Td* that is requested to the drive shaft 26 based on the accelerator opening degree Acc and the vehicle speed V, the electronic control unit 70 sets the requested torque Td* thus set to a torque command value Tm* of the motor 32, and the electronic control unit 70 performs a switching control on transistors of the inverter 34 so that the motor 32 is driven by the torque command Tm*. Further, in the travel control, the electronic control unit 70 sets a target voltage VH* for the high-voltage-side power line 42 so that the motor 32 can be driven by the torque command Tm*, and the electronic control unit 70 performs a switching control on two transistors of the boost converter 40 so that the voltage VH of the high-voltage-side power line 42 reaches the target voltage VH*.

Further, in the electric vehicle 20 of the embodiment, when the external-side connecting portion 154 of the external power supply device 120 at home or at a battery charging station or the like is connected to the vehicle side inlet 54 at the time when the electric vehicle 20 is parked, external charging to charge the battery 36 with electric power from the external power supply device 120 is performed. At this time, the electronic control unit 70 turns on the system main relay 38 and the charging relay 52 and turns off the diagnosis relay 60.

Figure 2:
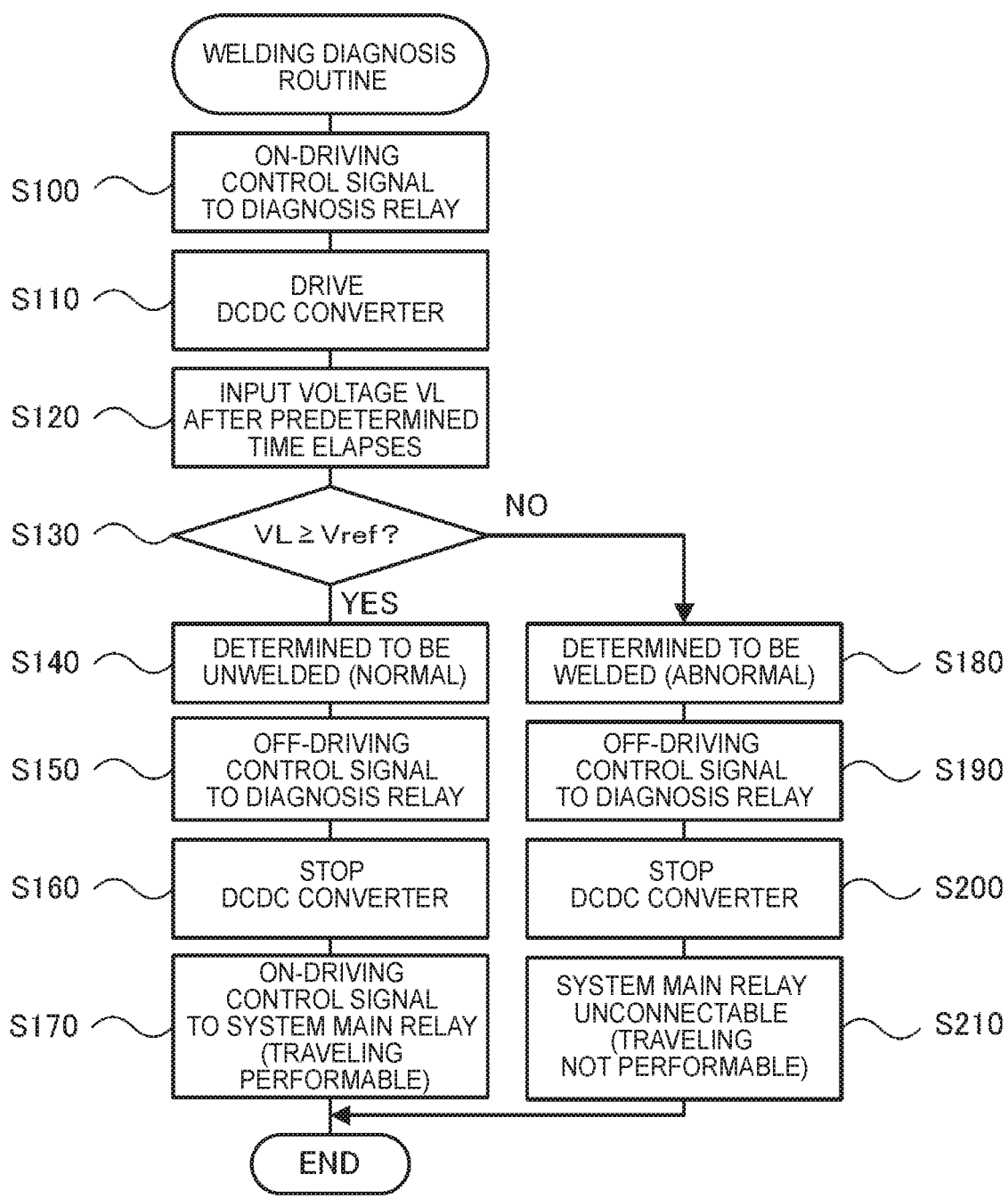
FIG. 2 is a flowchart illustrating an exemplary welding diagnosis routine to be executed by an electronic control unit 70.

Next will be described an operation of the electric vehicle 20 configured as such in the embodiment, particularly, an operation at the time when the electric vehicle 20 performs a welding diagnosis on the charging relay 52. FIG. 2 is a flowchart illustrating an exemplary welding diagnosis routine to be executed by the electronic control unit 70. This routine is executed when system startup is performed in the vehicle. Note that, in the embodiment, the system main relay 38 and the diagnosis relay 60 operate normally. Further, in the electric vehicle 20 of the embodiment, when the system stops, OFF control signals are output to the system main relay 38, the charging relay 52, and the diagnosis relay 60. Accordingly, when the execution of this routine is started, the system main relay 38 and the diagnosis relay 60 are turned off and the charging relay 52 is turned on or off depending on whether the charging relay 52 is welded or not.

When this routine is executed, the electronic control unit 70 first outputs an ON-driving control signal to the diagnosis relay 60 (step S100). Hereby, the diagnosis relay 60 is turned on so that the positive bus and the negative bus of the charging power line 50 are connected to each other (step S100). Hereby, the DCDC converter 64 is driven such that electric power from the auxiliary battery 62 is converted into electric power with a predetermined voltage VL1 (e.g., a voltage close to a voltage of the battery 36) and supplied to the low-voltage-side power line 44, so that the low-voltage-side capacitor 48 is charged (step S110). When the execution of this routine is started, the system main relay 38 is turned off, so that the low-voltage-side capacitor 48 is charged and the voltage of the low-voltage-side capacitor 48 is low. When the system main relay 38 is connected in this state, it is conceivable that the system main relay 38 is affected. In consideration of such an influence, in step S110, the DCDC converter 64 is driven in a state where the system main relay 38 is maintained to be off, and the low-voltage-side capacitor 48 is charged. Note that, the normal voltage of the auxiliary battery 62 is lower than that of the battery 36, so that electric power to be supplied from the auxiliary battery 62 to the low-voltage-side power line 44 via the DCDC converter 64 is relatively small.

Then, after a predetermined time has elapsed with the DCDC converter 64 being driven, the voltage VL of the low-voltage-side capacitor 48 from the voltage sensor 48a is input (step S120), and it is determined whether or not the voltage VL is at least a diagnosis voltage Vref (step S130). The diagnosis voltage Vref is a threshold based on which it is determined whether or not the voltage is applied to the low-voltage-side capacitor 48.

In step S100, the diagnosis relay 60 is turned on to connect the positive bus and the negative bus of the charging power line 50 to each other, and in step S110, the DCDC converter 64 is driven so that the voltage VL of the low-voltage-side capacitor 48 reaches the predetermined voltage VL1. When the positive-side relay DCRB and the negative-side relay DCRG of the charging relay 52 are both not welded, the charging relay 52 is turned off. In this case, even if the diagnosis relay 60 is turned on to connect the positive bus and the negative bus of the charging power line 50 to each other for short-circuit, short-circuit is not caused between the positive bus and the negative bus of the low-voltage-side power line 44, so that a voltage is applied to the low-voltage-side capacitor 48 and the voltage VL reaches the diagnosis voltage Vref or more. When the positive-side relay DCRB and the negative-side relay DCRG of the charging relay 52 are both welded, the charging relay 52 is turned on. In this case, when the diagnosis relay 60 is turned on to connect the positive bus and the negative bus of the charging power line 50 to each other for short-circuit, short-circuit is caused between the positive bus and the negative bus of the low-voltage-side power line 44, so that a voltage is not applied to the low-voltage-side capacitor 48. Accordingly, the voltage VL is less than the diagnosis voltage Vref. Thus, step S130 is a process of performing a both-pole welding diagnosis to determine whether the positive-side relay DCRB and the negative-side relay DCRG of the charging relay 52 are both welded or not. Now, at the time of system startup, the system main relay 38 is turned off, and short-circuit is caused between the positive bus and the negative bus of the charging power line 50, so that it is possible to avoid the voltage of the battery 36 from being applied to the vehicle side inlet 54 at the time when the both-pole welding diagnosis is performed on the charging relay 52. Note that the electric power supplied from the auxiliary battery 62 to the low-voltage-side power line 44 via the DCDC converter 64 is relatively small. On this account, in a case where the positive-side relay DCRB and the negative-side relay DCRG of the charging relay 52 are both welded, even when the DCDC converter 64 is driven in a state where short-circuit is caused between the positive bus and the negative bus of the charging power line 50, a welding diagnosis can be performed without affecting the diagnosis relay 60 so much.

When the voltage VL is the diagnosis voltage Vref or more in step S130, it is determined that the charging relay 52 is unwelded (normal) (step S140). Then, an OFF-driving control signal is output to the diagnosis relay 60 so as to turn off the diagnosis relay 60 (step S150), and the DCDC converter 64 is stopped (step S160). Then, an ON-driving control signal is output to the system main relay 38 so as to turn on the system main relay 38, so that the electric vehicle 20 enters a state where the electric vehicle 20 can travel (step S170), and here, the routine is finished. At this time, in step S110, the DCDC converter 64 is driven such that electric power from the auxiliary battery 62 is converted into electric power with the predetermined voltage VL1 (e.g., a voltage close to the voltage of the battery 36) and supplied to the low-voltage-side power line 44, so that the voltage of the low-voltage-side power line 44 on a side closer to the low-voltage-side capacitor 48 than the system main relay 38 is the predetermined voltage VL1 (the voltage close to the voltage of the battery 36). On this account, when the system main relay 38 is turned on in step S170, a voltage difference between a side closer to the battery 36 than the system main relay 38 and the side closer to the low-voltage-side capacitor 48 than the system main relay 38 is small. Accordingly, it is possible to restrain a relatively large current from flowing into the system main relay 38, thereby achieving protection of the system main relay 38.

Figure 3:
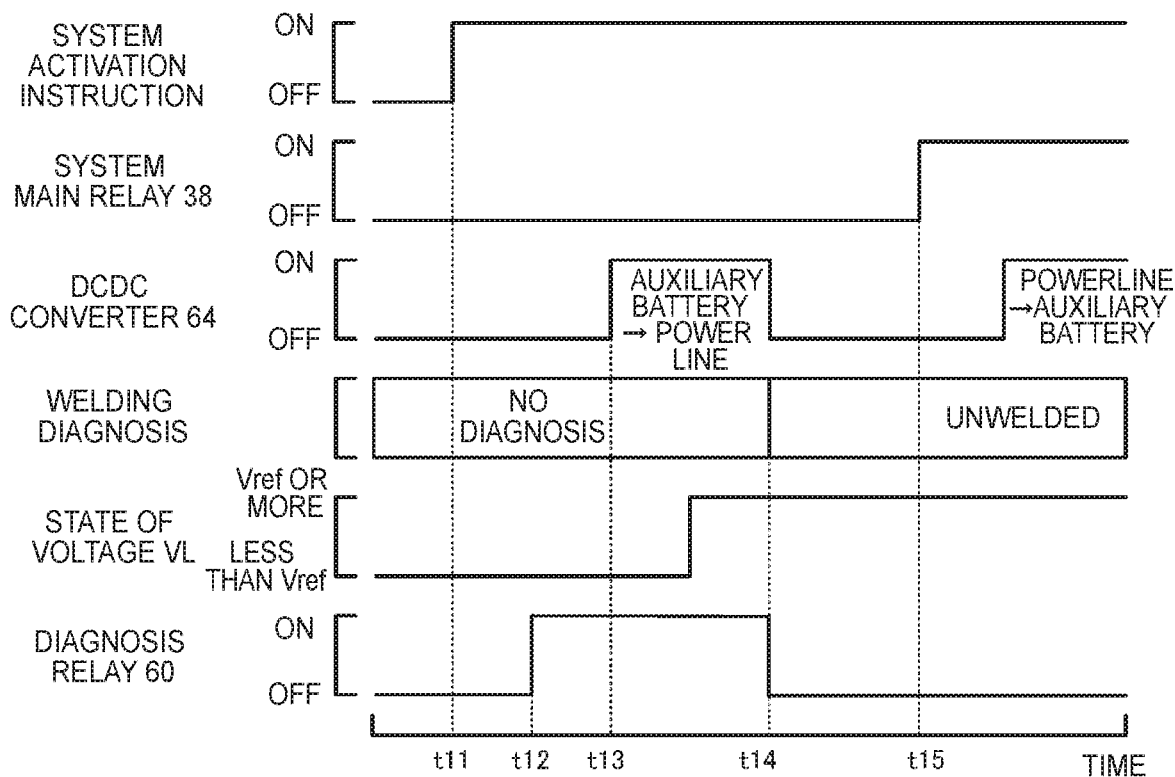
FIG. 3 is a timing chart illustrating exemplary changes with time of a system activation instruction, a state of a system main relay 38, a state of a DCDC converter 64, a result of a welding diagnosis, a state of a voltage VL, and a state of a diagnosis relay 60, when a charging relay 52 is unwelded (normal)

FIG. 3 is a timing chart illustrating exemplary changes with time of a system activation instruction, a state of the system main relay 38, a state of the DCDC converter 64, a result of the welding diagnosis, a state of the voltage VL, and a state of the diagnosis relay 60, when the charging relay 52 is unwelded (normal). When a system activation instruction is made (time t11), the diagnosis relay 60 is turned on (step S100, time t12) to drive (turn on) the DCDC converter 64 so as to convert electric power of the auxiliary battery 62 into electric power with the predetermined voltage VL1 and supply it to the charging power line 50 (step S110, time t13). When the charging relay 52 is unwelded (normal), the charging relay 52 is turned off, so that a voltage is applied to the low-voltage-side capacitor 48 and the voltage VL of the low-voltage-side capacitor 48 rises. Then, when the voltage VL reaches the diagnosis voltage Vref or more, it is determined that the charging relay 52 is unwelded (normal), and the diagnosis relay 60 is turned off to stop (turn off) the DCDC converter 64 (steps S140 to S160, time t14). Then, the system main relay 38 is turned on (step S170, time t15), so that a state where the electric vehicle 20 can travel is established. When the state where the electric vehicle 20 can travel is established, the DCDC converter 64 starts driving and supplies electric power from the battery 36 to the auxiliary battery 62 with a voltage conversion. Thus, when the charging relay 52 is unwelded, the state where the electric vehicle 20 can travel can be established.

When the voltage VL is less than the diagnosis voltage Vref in step S130, it is determined that the charging relay 52 is welded (abnormal) (step S180), so that an OFF-driving control signal is output to the diagnosis relay 60 so as to turn off the diagnosis relay 60 (step S190), so that the DCDC converter 64 is stopped (step S200). Then, the system main relay 38 is turned off (step S210) so as to establish a state where the electric vehicle 20 cannot travel, and here, this routine is finished. Thus, when the charging relay 52 is welded, the state where the electric vehicle 20 cannot travel can be established.

Figure 4:
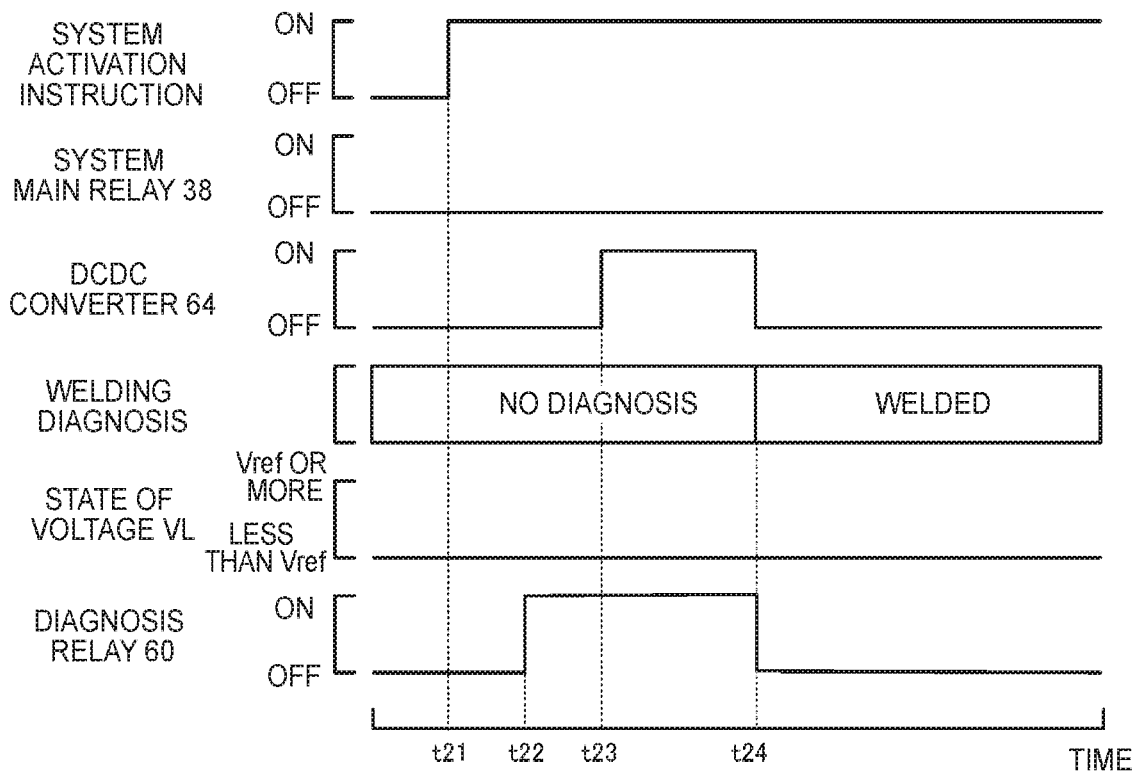
FIG. 4 is a timing chart illustrating exemplary changes with time of the system activation instruction, the state of the system main relay 3S, the state of the DCDC converter 64, the result of the welding diagnosis, the state of the voltage VL, and the state of the diagnosis relay 60, when both poles of the charging relay 52 are welded (abnormal)

FIG. 4 is a timing chart illustrating exemplary changes with time of the system activation instruction, the state of the system main relay 38, the state of the DCDC converter 64, the result of the welding diagnosis, the state of the voltage VL, and the state of the diagnosis relay 60, when the positive-side relay DCRB and the negative-side relay DCRG of the charging relay 52 are both welded (abnormal). When a system activation instruction is made (time t21), the diagnosis relay 60 is turned on (step S100, time t22) to drive the DCDC converter 64 so as to convert electric power of the auxiliary battery 62 into electric power with the predetermined voltage VL1 and supply it to the charging power line 50 (step S110, time t23). When the positive-side relay DCRB and the negative-side relay DCRG of the charging relay 52 are both welded (abnormal), the charging relay 52 is turned on, so that short-circuit is caused between the positive bus and the negative bus of the low-voltage-side power line 44. Then, the voltage VL of the low-voltage-side capacitor 48 becomes less than the diagnosis voltage Vref, and it is determined that the charging relay 52 is welded (abnormal). Here, the diagnosis relay 60 is turned off so that the DCDC converter 64 is stopped (turned off) (steps S180 to S200, time t24). Hereby, the system main relay 38 is made unconnectable so that a state where the electric vehicle 20 cannot travel is established (step S210). Thus, when the charging relay 52 is welded, the state where the electric vehicle 20 cannot travel can be established.

The electric vehicle 20 of the embodiment described above includes the diagnosis relay 60, the auxiliary battery 62, and the DCDC converter 64, and at the time of system activation, the charging relay 52 is controlled so that the positive bus and the negative bus of the charging power line 50 are connected to each other, and after that, a welding diagnosis to determine whether welding occurs in the charging relay 52 or not is performed based on the voltage VL of the low-voltage-side capacitor 48 while the DCDC converter 64 is controlled so that the low-voltage-side capacitor 48 is charged with electric power from the auxiliary battery 62. Hereby, it is possible to avoid the voltage of the battery 36 from being applied to the vehicle side inlet 54 at the time when the welding diagnosis is performed on the charging relay 52.

Figure 5:
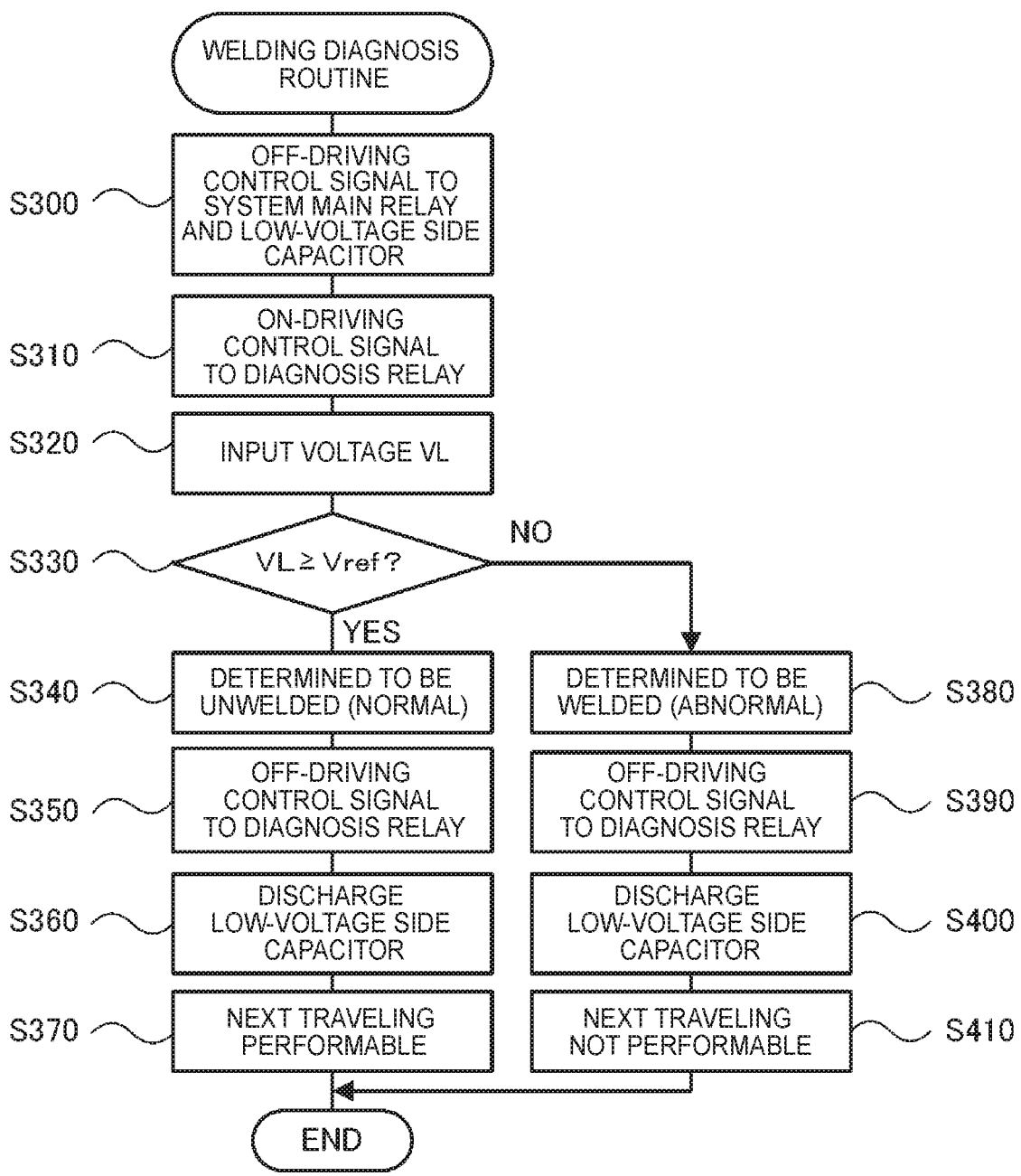
FIG. 5 is a flowchart illustrating an exemplary welding diagnosis routine to be executed by the electronic control unit 70 when external charging stops irregularly.

In the electric vehicle 20 of the embodiment, the welding diagnosis routine illustrated in FIG. 2 is executed at the time of system activation. However, when the external charging from the external power supply device 120 stops irregularly, including a case where a status signal from the voltage sensor 50a is turned off during the external charging, the welding diagnosis routine may be executed. FIG. 5 is a flowchart illustrating an exemplary welding diagnosis routine to be executed by the electronic control unit 70 when the external charging stops irregularly.

When the welding diagnosis routine in FIG. 5 is executed, the electronic control unit 70 outputs OFF-driving control signals to the system main relay 38 and the charging relay 52 (step S300). At this time, the system main relay 38 is normal and turned off. The charging relay 52 is turned on or off depending on whether the charging relay 52 is welded or not. The low-voltage-side capacitor 48 is charged to some extent by the external charging before irregular stop.

Then, the diagnosis relay 60 is turned on by processes similar to steps S100, S120, S130 of the welding diagnosis routine in FIG. 2, and it is determined whether or not the voltage VL of the low-voltage-side capacitor 48 is at least the diagnosis voltage Vref (steps S310, S320, S330).

When the voltage VL of the low-voltage-side capacitor 48 is the diagnosis voltage Vref or more in step S330, it is determined that the charging relay 52 is unwelded (normal) by processes similar to steps S140, S150 of the welding diagnosis routine in FIG. 2, and the diagnosis relay 60 is turned off (steps S340, S350).

Then, the low-voltage-side capacitor 48 is discharged (step S360), and it is determined that the electric vehicle 20 can navel next time (step S370), and here, the routine is Finished. The discharge of the low-voltage-side capacitor 48 in step S360 is performed such that the DCDC converter 64 is stopped after the DCDC converter 64 is driven for a predetermined time so that the auxiliary battery 62 is charged with electric power from the low-voltage-side capacitor 48. With such a process, when the charging relay 52 is unwelded (normal), next traveling can be permitted.

Figure 6:
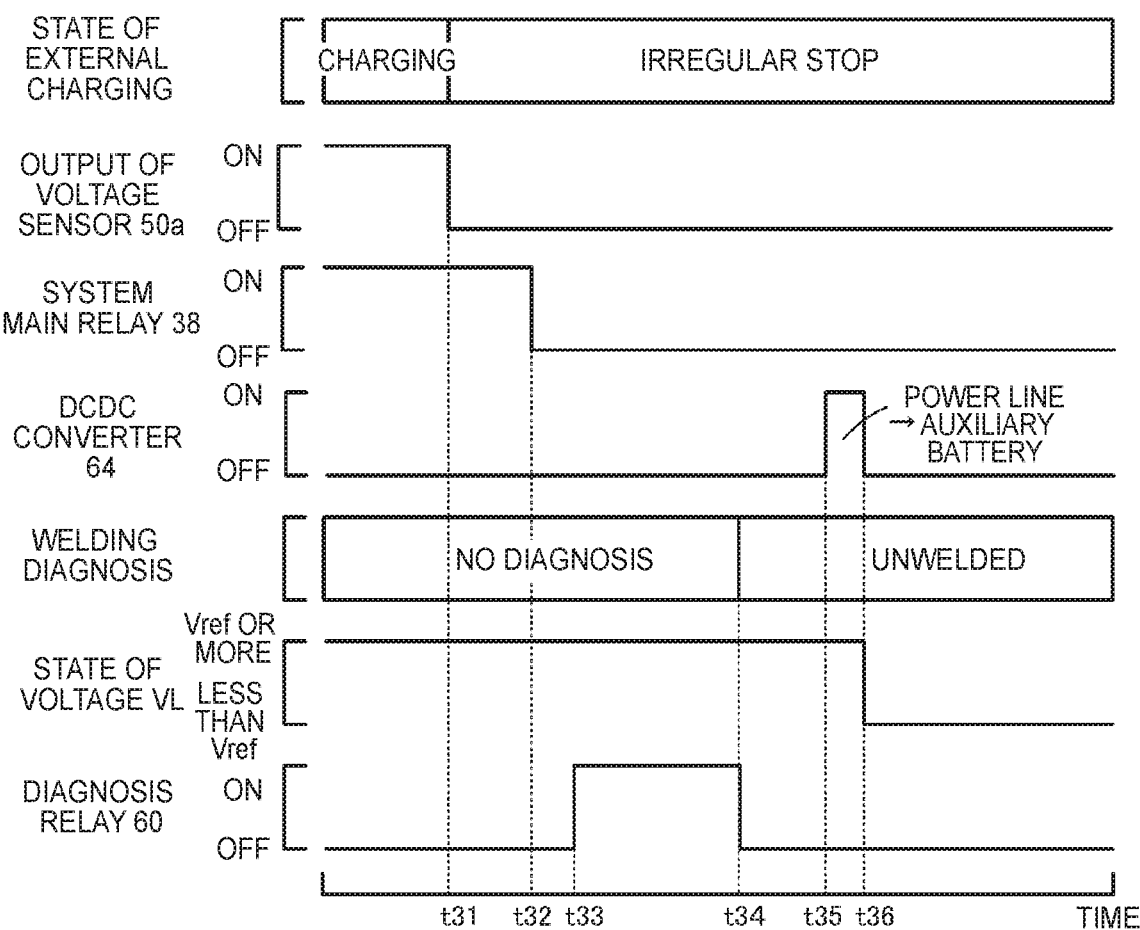
FIG. 6 is a timing chart illustrating exemplary changes with time of a state of the external charging, an output from a voltage sensor 50a, the state of the system main relay 38, the state of the DCDC converter 64, the state of the welding diagnosis, the state of the voltage VL, and the state of the diagnosis relay 60, when the charging relay 52 is unwelded (normal)

FIG. 6 is a timing chart illustrating exemplary changes with time of a state of the external charging, an output from the voltage sensor 50a, the state of the system main relay 38, the slate of the DCDC converter 64, the state of the welding diagnosis, the state of the voltage VL, and the state of the diagnosis relay 60, when the charging relay 52 is unwelded (normal). When the external charging slops irregularly, the output of the voltage sensor 50a is turned off (time t31), and the welding diagnosis routine illustrated in FIG. 5 is executed. When the welding diagnosis routine is executed, the system main relay 38 is turned off (step S300, time t32), and the diagnosis relay 60 is turned on (step S310, time t33). When the voltage VL of the low-voltage-side capacitor 48 is the diagnosis voltage Vref or more, it is determined that the charging relay 52 is unwelded (normal), and the diagnosis relay 60 is turned off (steps S340, S350, time t34). Then, the DCDC converter 64 is driven (turned on) and the low-voltage-side capacitor 48 is discharged so that the voltage VL becomes less than the diagnosis voltage Vref (step S360, time t35, t36). Hereby, next traveling of the electric vehicle 20 is permitted. Thus, when the charging relay 52 is unwelded, the low-voltage-side capacitor 48 is discharged, so that next traveling of the electric vehicle 20 can be permitted.

When the voltage VL of the low-voltage-side capacitor 48 is less than the diagnosis voltage Vref in step S330, it is determined that the charging relay 52 is welded (abnormal) by processes similar to steps S180, S190 of the welding diagnosis routine in FIG. 2, and the diagnosis relay 60 is turned off (steps S380, S390). Then, the low-voltage-side capacitor 48 is discharged (step S400) by a process similar to step S360, and next traveling is made unperformable (step S410). Here, the routine is finished. Thus, when the charging relay 52 is welded, next traveling of the electric vehicle 20 can be made unperformable.

Figure 7:
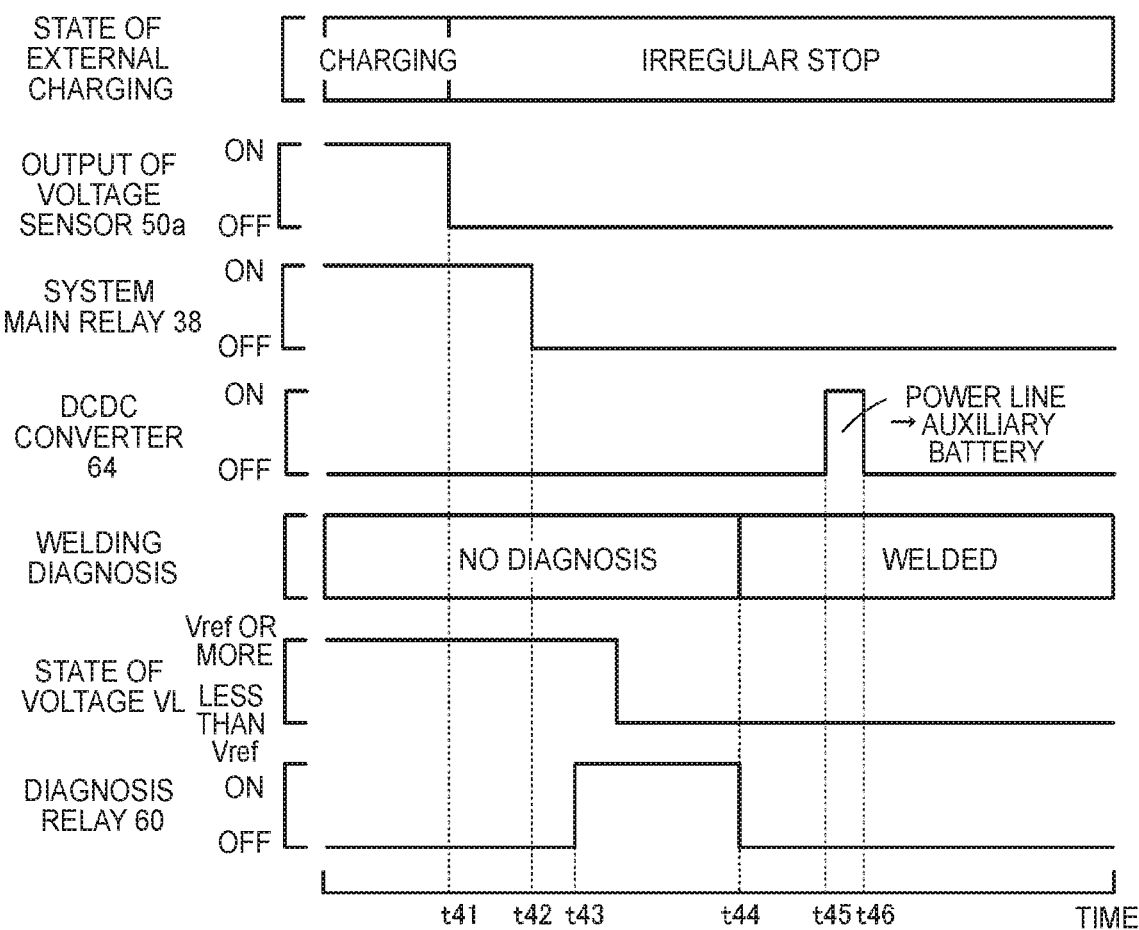
FIG. 7 is a timing chart illustrating exemplary changes with time of the state of the external charging, the output from the voltage sensor 50a, the state of the system main relay 38, the state of the DCDC converter 64, the state of the welding diagnosis, the state of the voltage VL, and the state of the diagnosis relay 60, when the charging relay 52 is welded (abnormal)

FIG. 7 is a timing chart illustrating exemplary changes with time of the state of the external charging, the output from the voltage sensor 50a, the state of the system main relay 38, the state of the DCDC converter 64, the state of the welding diagnosis, the state of the voltage VL, and the state of the diagnosis relay 60, when the charging relay 52 is welded (abnormal). When the external charging stops irregularly, the output of the voltage sensor 50a is turned off (time t41), and the welding diagnosis routine illustrated in FIG. 5 is executed. When the welding diagnosis routine is executed, the system main relay 38 is turned off (step S300, time t42), and the diagnosis relay 60 is turned on (step S310, time t43). When the charging relay 52 is welded, short-circuit is caused between the positive bus and the negative bus of the charging power line 50, so that the voltage VL becomes less than the diagnosis voltage Vref. Accordingly, it is determined that the charging relay 52 is welded (abnormal), and the diagnosis relay 60 is turned off (steps S380, S390, time t44). Then, the DCDC converter 64 is driven (turned on), so that the low-voltage-side capacitor 48 is discharged (step S400, time t45, t46). Thus, when the charging relay 52 is welded, the low-voltage-side capacitor 48 is discharged, so that traveling of the electric vehicle 20 can be made unperformable. With such a process, when the external charging from the external power supply device 120 stops irregularly, it is possible to avoid the voltage of the battery 36 from being applied to the vehicle side inlet 54 at the time when the welding diagnosis is performed on the charging relay 52.

Note that, when the external-side connecting portion 154 of the external power supply device 120 is connected to the vehicle side inlet 54 during the execution of the welding diagnosis routine in FIG. 5, a voltage might be applied to the charging power line 50. On this account, in a case where the diagnosis relay 60 is turned on, the diagnosis relay 60 is turned off so as to finish the welding diagnosis routine in FIG. 5.

In the electric vehicle 20 of the embodiment, it is determined whether or not both-pole welding is caused in the charging relay 52, in the welding diagnosis routine illustrated in FIG. 2. However, instead of the determination on whether or not both-pole welding is caused in the charging relay 52 or in addition to the determination on whether or not both-pole welding is caused in the charging relay 52, it may be determined whether or not one-pole welding is caused in the charging relay 52 (whether one of the positive-side relay DCRB and the negative-side relay DCRG is welded or not).

Figure 8:
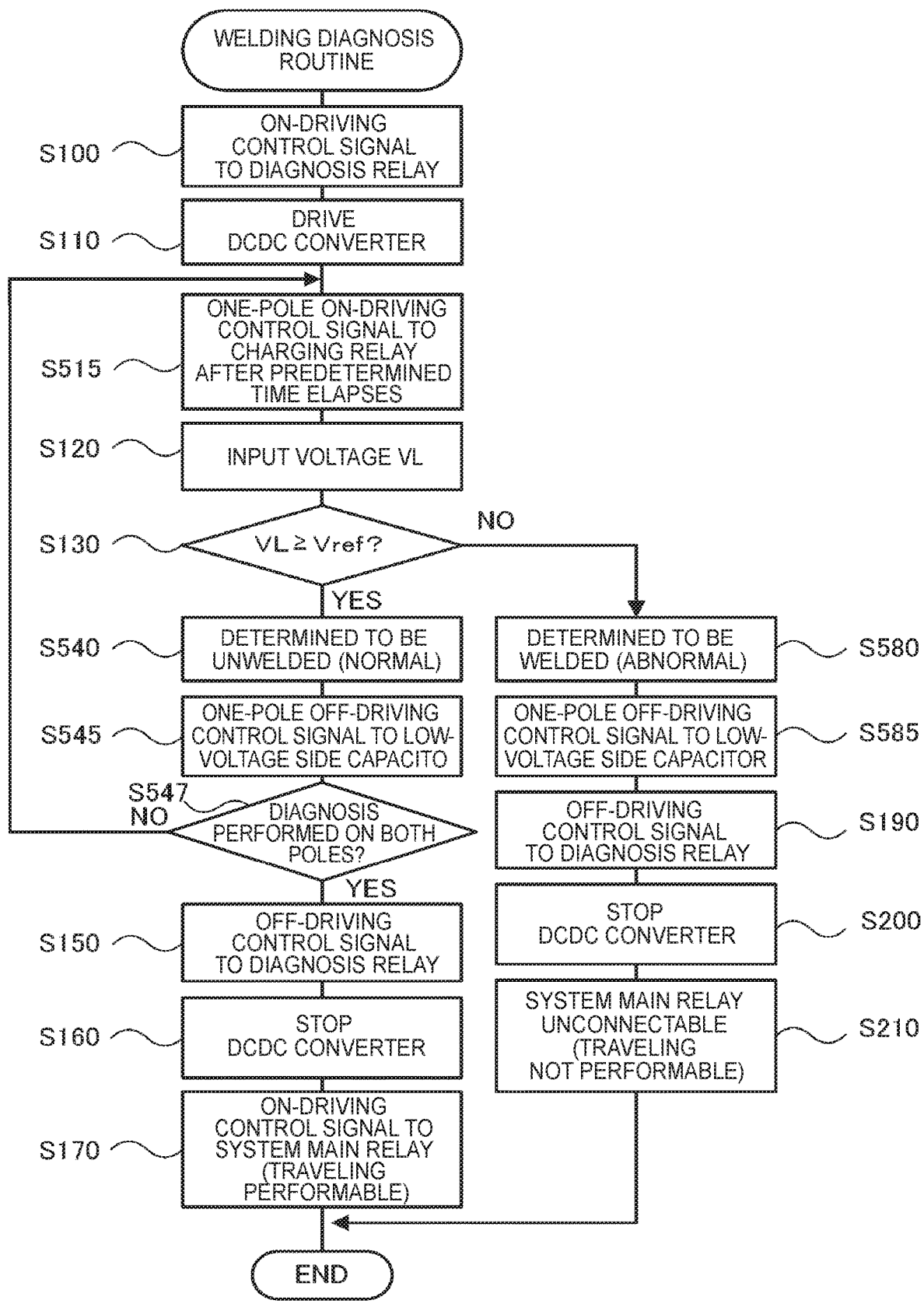
FIG. 8 is a flowchart illustrating an exemplary welding diagnosis routine of a modification.

FIG. 8 is a flowchart illustrating an exemplary welding diagnosis routine of a modification. In this routine, it is determined whether or not one-pole welding is caused in the charging relay 52, instead of determining whether or not both-pole welding is caused in the charging relay 52. In the welding diagnosis routine in FIG. 8, the same process as the welding diagnosis routine of FIG. 2 is executed except that step S515 is executed between step S110 and step S120 of the welding diagnosis routine in FIG. 2, and steps S540, S545, S547, S580, S585 are executed instead of steps S140, S180. Accordingly, a detailed description of the same process as the welding diagnosis routine in FIG. 2 is omitted.

In the welding diagnosis routine in FIG. 8, when the DCDC converter 64 is driven in step S110, a one-pole ON driving control signal is output to the charging relay 52 so that either one of the positive-side relay DCRB and the negative-side relay DCRG of the charging relay 52 is turned on (one-pole ON) (step S515). Then, the voltage VL is input and it is determined whether or not the voltage VL is at least the diagnosis voltage Vref (steps S120, S130). When the other one of the positive-side relay DCRB and the negative-side relay DCRG that is not turned on in step S515 is unwelded (normal), short-circuit is not caused between the positive bus and the negative bus of the low-voltage-side power line 44. Accordingly, the low-voltage-side capacitor 48 is charged with electric power supplied from the auxiliary battery 62 via the DCDC converter 64, so that the voltage VL rises. When the other one of the positive-side relay DCRB and the negative-side relay DCRG that is not turned on in step S515 is welded (one-pole welding is caused) (abnormal), the positive-side relay DCRB and the negative-side relay DCRG of the charging relay 52 are both turned on and short-circuit is caused between the positive bus and the negative bus of the low-voltage-side power line 44. Accordingly, the voltage VL of the charging power line 50 does not rise. Thus, in step S130 in the welding diagnosis routine in FIG. 8, a one-pole welding diagnosis to determine whether one of the positive-side relay DCRB and the negative-side relay DCRG of the charging relay 52 is welded or not is performed. At this time, the system main relay 38 is turned off, and short-circuit is caused between the positive bus and the negative bus of the low-voltage-side power line 44. Accordingly, it is possible to avoid the voltage of the battery 36 from being applied to the vehicle side inlet 54 at the time when the one-pole welding diagnosis is performed on the charging relay 52.

When the voltage VL is the diagnosis voltage Vref or more in step S130, it is determined that the other one (one pole) of the positive-side relay DCRB and the negative-side relay DCRG that is not turned on in step S515 is unwelded (normal) (step S540), and a one-pole OFF-driving control signal to turn off the one of the positive-side relay DCRB and the negative-side relay DCRG of the charging relay 52, the one being turned on in step S515, is output, so that the one of the positive-side relay DCRB and the negative-side relay DCRG is turned off (step S545).

Subsequently, it is determined whether or not the one-pole welding diagnosis has been performed on both of the positive-side relay DCRB and the negative-side relay DCRG (step S547). When the one-pole welding diagnosis has been performed on only one of the positive-side relay DCRB and the negative-side relay DCRG, the process returns to step S515, and steps S120, S130 are executed on the other one of the positive-side relay DCRB and the negative-side relay DCRG that has not been subjected to the one-pole welding diagnosis. Then, when it is determined that no welding is caused (it is determined to be normal) (step S540), a one-pole OFF-driving control signal to turn off one of the positive-side relay DCRB and the negative-side relay DCRG of the charging relay 52, the one being turned on in step S515, is output so that the one of the positive-side relay DCRB and the negative-side relay DCRG is turned off (step S545). Subsequently, in step S547, it is determined that the one-pole welding diagnosis has been performed on both of the positive-side relay DCRB and the negative-side relay DCRG. Accordingly, the diagnosis relay 60 is turned off (step S150), and the DCDC converter 64 is stopped (step S160). Then, the system main relay 38 is turned on so as to establish a state where the electric vehicle 20 can travel (step S170), and here, this routine is finished.

When the voltage VL is less than the diagnosis voltage Vref in step S130, it is determined that the other one of the positive-side relay DCRB and the negative-side relay DCRG of the charging relay 52, the other one being not turned on in step S515, is welded (abnormal) (step S580), and a one-pole OFF-driving control signal to turn off the one of the positive-side relay DCRB and the negative-side relay DCRG of the charging relay 52, the one being turned on in step S515, is output so as to turn off the one of the positive-side relay DCRB and the negative-side relay DCRG of the charging relay 52 (step S585). Then, the diagnosis relay 60 is turned off (step S190), so that the DCDC converter 64 is stopped (step S200). After that, the system main relay 38 is turned off so as to establish a state where the electric vehicle 20 cannot travel (step S210), and here, this routine is finished. Thus, when one of the positive-side relay DCRB and the negative-side relay DCRG of the charging relay 52 is welded, traveling of the electric vehicle 20 can be made unperformable.

Note that, herein, the welding diagnosis routine in FIG. 8 is a modification of the welding diagnosis routine of FIG. 2 but is also applicable to the welding diagnosis routine in FIG. 5.

In the electric vehicle 20 of the embodiment, the diagnosis relay 60 is provided in the charging power line 50, so that the diagnosis relay 60 is turned on and off so as to perform connection and disconnection between the positive bus and the negative bus of the charging power line 50. However, the disclosure is not limited to this, provided that a switch that performs connection and disconnection between the positive bus and the negative bus of the charging power line 50 is provided. For example, instead of the diagnosis relay 60, a transistor configured to be turned on and off in response to a control signal may be provided.

In the electric vehicle 20 of the embodiment, at the time of system activation, the welding diagnosis routine in FIG. 2 is executed without informing an occupant of the execution of the welding diagnosis on the charging relay 52. However, it takes time to execute the welding diagnosis routine. In view of this, the occupant may be informed of the execution of the welding diagnosis routine in FIG. 2 in such a manner that a lamp is provided near a driver seat so as to be flashed when the welding diagnosis routine in FIG. 2 is executed or a notification device configured to notify the occupant of information by giving utterance is provided, for example.

In the electric vehicle 20 of the embodiment, the battery 36 is used as a power storage device, but a capacitor or the like may be used as the power storage device, provided that the power storage device is a rechargeable device.

In the electric vehicle 20 of the embodiment, the voltage sensor 48a detects the voltage of the low-voltage-side capacitor 48, but may detect whether or not a voltage is applied to the low-voltage-side capacitor 48.

In the present embodiment, the charging device is provided in the electric vehicle 20 including the motor 32, the inverter 34, and the boost converter 40. However, the charging device may be provided in the electric vehicle 20 that does not include the boost converter 40. Further, the charging device may be provided in a hybrid vehicle including an engine in addition to the motor 32, the inverter 34, and the boost converter 40. Further, the charging device is not limited to one to be provided in such an automobile and may be provided in any device, provided that the device includes a power storage device. Further, the charging device may be provided in the form of a single body as a charging device.

The following describes a correspondence between main elements of the embodiment and main elements of the disclosure described in the field of SUMMARY. The present embodiment corresponds to a first charging device of the disclosure as follows. The system main relay 38 corresponds to "system main relay." the low-voltage-side capacitor 48 corresponds to "capacitor," the vehicle side inlet 54 corresponds to "charging-side connecting portion," the charging relay 52 corresponds to "charging relay," the electronic control unit 70 corresponds to "control device," the diagnosis relay 60 corresponds to "switch," the auxiliary battery 62 corresponds to "low-voltage power storage device," and the DCDC converter 64 corresponds to "converter." The present embodiment corresponds to a second charging device of the disclosure as follows. The system main relay 38 corresponds to "system main relay," the low-voltage-side capacitor 48 corresponds to "capacitor," the vehicle side inlet 54 corresponds to "charging-side connecting portion," the charging relay 52 corresponds to "charging relay," the electronic control unit 70 corresponds to "control device," and the diagnosis relay 60 corresponds to "switch."

Note that, since the embodiment is an example to specifically describe a mode for carrying out the disclosure described in the field of SUMMARY, the correspondence between the main elements of the embodiment and the main elements of the disclosure described in the field of SUMMARY does not limit the elements of the disclosure described in the field of SUMMARY. That is, the disclosure described in the field of SUMMARY should be interpreted based on the description of the field, and the embodiment is just a concrete example of the disclosure described in the field of SUMMARY.

The mode for carrying out the disclosure has been described with reference to the embodiment, but it is needless to say that the disclosure is not limited to the above embodiment at all and may be performable in various embodiments as long as the various embodiments are not beyond the gist thereof.

The disclosure is usable in a manufacture industry of a charging device, and the like.

What is claimed is:

1. A charging device for performing external charging to charge a power storage device with electric power from an external power supply device, the charging device comprising:
   a system main relay configured to perform connection and disconnection between the power storage device and a power line;
   a capacitor connected to a positive bus and a negative bus of the power line;
   a charging-side connecting portion connectable to an external-side connecting portion of the external power supply device;

a charging relay configured to perform connection and disconnection between the power line and a charging line connected to the charging-side connecting portion;
a control device configured to control the system main relay and the charging relay;
a switch configured to perform connection and disconnection between a positive bus and a negative bus of the charging line;
a low-voltage power storage device having a normal voltage lower than a normal voltage of the power storage device; and
a converter configured to exchange electric power between the power line and the low-voltage power storage device with a change of a voltage, wherein, at a time of system activation, the control device controls the switch so that the positive bus and the negative bus of the charging line are connected to each other, and after that, the control device performs a welding diagnosis to determine whether or not welding occurs in the charging relay, based on a voltage of the capacitor, while the control device controls the converter so that the capacitor is charged with electric power from the low-voltage power storage device.

2. The charging device according to claim 1, wherein, in the welding diagnosis, when the voltage of the capacitor is a diagnosis voltage or more, the control device determines that no welding occurs in the charging relay, and when the voltage of the capacitor is less than the diagnosis voltage, the control device determines that welding occurs in the charging relay.

3. The charging device according to claim 1, wherein:
the charging relay includes
a positive-side relay configured to perform connection and disconnection between the positive bus of the charging line and the positive bus of the power line, and
a negative-side relay configured to perform connection and disconnection between the negative bus of the charging line and the negative bus of the power line; and
as the welding diagnosis, the control device determines whether one-pole welding in which either one of the positive-side relay and the negative-side relay is welded occurs or not.

4. A charging device for performing external charging to charge a power storage device with electric power from an external power supply device, the charging device comprising:
a system main relay configured to perform connection and disconnection between the power storage device and a power line;
a capacitor connected to a positive bus and a negative bus of the power line;
a charging-side connecting portion connected to an external-side connecting portion of the external power supply device;
a charging relay configured to perform connection and disconnection between the power line and a charging line connected to the charging-side connecting portion;
a control device configured to control the system main relay and the charging relay; and
a switch configured to perform connection and disconnection between a positive bus and a negative bus of the charging line, wherein, when the external charging stops irregularly, the control device controls the system main relay and the charging relay so that the system main relay and the charging relay are turned off, and after that, the control device performs a welding diagnosis to determine whether or not welding occurs in the charging relay, based on a voltage of the capacitor, while the control device controls the switch so that the positive bus and the negative bus of the charging line are connected to each other.

5. The charging device according to claim 4, further comprising:
a low-voltage power storage device having a normal voltage lower than a normal voltage of the power storage device; and
a converter configured to exchange electric power between the power line and the low-voltage power storage device with a change of a voltage, wherein, after the control device performs the welding diagnosis, the control device controls the converter so that the capacitor is discharged.

6. The charging device according to claim 4, wherein, in the welding diagnosis, when the voltage of the capacitor is a diagnosis voltage or more, the control device determines that no welding occurs in the charging relay, and when the voltage of the capacitor is less than the diagnosis voltage, the control device determines that welding occurs in the charging relay.

7. The charging device according to claim 4, wherein:
the charging relay includes
a positive-side relay configured to perform connection and disconnection between the positive bus of the charging line and the positive bus of the power line, and
a negative-side relay configured to perform connection and disconnection between the negative bus of the charging line and the negative bus of the power line; and
as the welding diagnosis, the control device determines whether one-pole welding in which either one of the positive-side relay and the negative-side relay is welded occurs or not.

* * * * *